Patented Sept. 1, 1953

2,650,925

UNITED STATES PATENT OFFICE 2,650,925

N,N'-PIPERAZINE DICARBAMATE OF 2,4-DI-HYDROXYPHENYLTHIOL

Vasili Ouperoff-Urne, Helsinki, Finland, assignor of one-half to Laaketehdas Orion Oy, Helsinki, Finland No Drawing. Application July 3, 1948, Serial No. 37,055. In France May 3, 1948

1 Claim. (Cl. 260—268)

The present invention relates to new chemical compounds which may be designated as N-substituted or non-substituted carbamates of hydroxyarylthiols corresponding to the general formula:

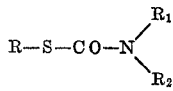

wherein R is an aryl radical containing one or more hydroxyl groups, one of which is necessarily in the ortho position in relation to the sulfur atom and may contain substituents such as halogens, alkyl or alkoxy groups and $R_1$ and $R_2$ are hydrogen atoms or alkyl groups forming possibly a heterocyclic radical between them.

Applicants have found that reaction with primary or secondary aliphatic amines causes O. S. (1,2) arylthiocarbonates of the following formula

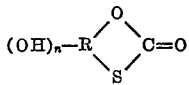

wherein R=aryl (described by Kaufmann, Arch. Pharm. 267 (1929), 192, and Werner, U. S. Patent No. 2,332,418) to undergo opening of the ring:

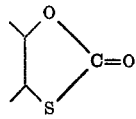

Treatment of the resulting product with an acid produces carbamates of the hydroxyarylthiols having the formula:

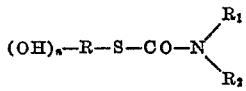

wherein R, $R_1$ and $R_2$ have the same meaning as above.

This reaction takes place at room temperature in an aqueous medium or in an organic solvent such as acetone. To complete the reaction an excess of ammonia or amine may be employed.

The carbamates of the hydroxyarylthiols thus obtained are stable in the crystalline state, and some of them are stable even in alkaline aqueous solution.

They may be used as coupling components in the preparation of azo coloring matters, as well as in the diazotype photographic process for making heliographic papers of "two components." They are suitable for the synthesis of pharmaceutical products and disinfectants.

The following examples are given for the purpose of illustrating the invention but without limiting it to the specific details thereof.

Example 1.—1.66 g. of O. S.-(1,2)-[5-toluylene]-thiocarbonate is agitated with a mixture of 4 cc. ammonia 10 N and 4 cc. of acetone to complete dissolution. The solution obtained is left standing for 30 minutes, and is then poured into ice water and acidified with hydrochloric acid, the precipitate formed comprises the carbamate of 2-hydroxy-5-methylphenylthiol, melting point 119° C., having the following formula:

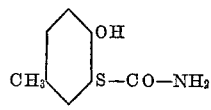

Example 2.—8.4 g. of O. S. (1,2)-4-hydroxyphenylene-thiocarbonate is dissolved in 21 cc. of an aqueous solution of methylamine comprising 3.75 mols per liter of water. The solution obtained is cooled and treated as indicated above. N-methylcarbamate of 2,4-dihydroxyphenylthiol, melting point 139° C., having the formula:

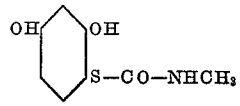

is thus obtained.

Example 3.—A solution of 8.4 g. of O. S.-(1,2)-[4-hydroxyphenylene]-thiocarbonate in 50 cc. of acetone is added to 25 cc. of an aqueous solution of piperazine comprising 1.5 mol per liter of water. The N,N'-piperazine-dicarbamate of the 2,4-dihydroxyphenylthiol, melting point 215° C. having the formula:

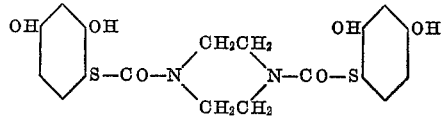

is separated in the manner indicated above.

I claim:

As a new product, a substance of the following formula:

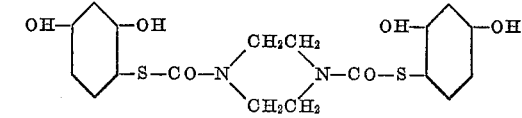

VASILI OUPEROFF-URNE.

References Cited in the file of this patent

UNITED STATES PATENTS

| Number | Name | Date |
|---|---|---|
| 2,187,728 | Christiansen | Jan. 23, 1940 |
| 2,290,274 | Bywater et al. | July 21, 1942 |
| 2,386,026 | Wilson et al. | Oct. 2, 1945 |

FOREIGN PATENTS

| Number | Country | Date |
|---|---|---|
| 559,733 | Germany | Sept. 8, 1932 |
| 789,500 | France | Oct. 29, 1935 |

OTHER REFERENCES

Bull. Soc. Chim. (4), vol. 1, 735-6 (1907).